H. P. MAGONE.
HOSE COUPLING.
APPLICATION FILED NOV. 21, 1908.
925,713.
Patented June 22, 1909.
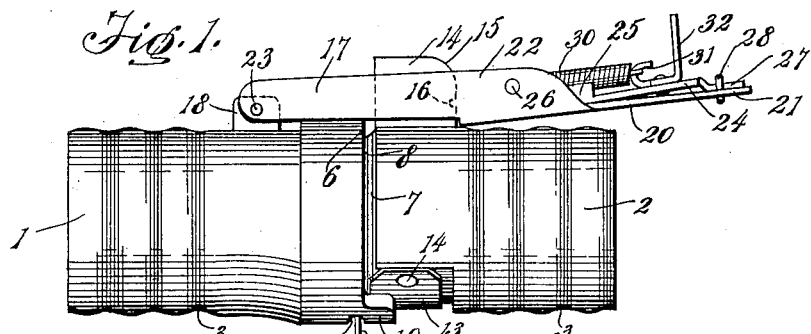
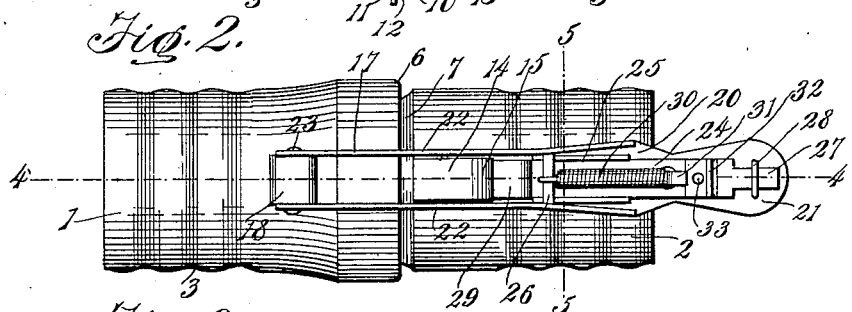
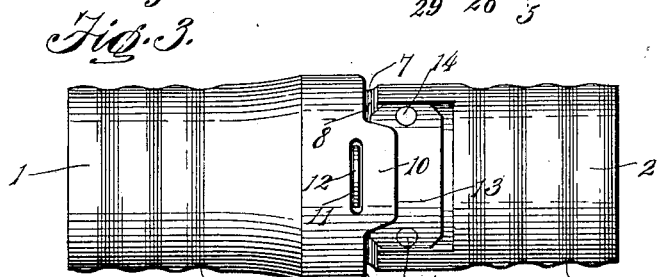
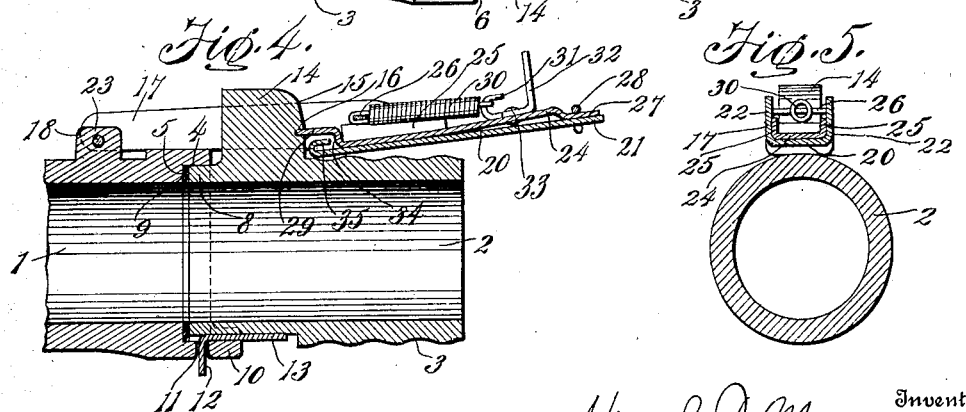
Witnesses
Rose S. Johnson
Nma L. Martin
Inventor
Hugh P. Magone
By Watson E. Coleman
Attorney

UNITED STATES PATENT OFFICE.

HUGH P. MAGONE, OF RACE TRACK, MONTANA.

HOSE-COUPLING.

No. 925,713.      Specification of Letters Patent.      Patented June 22, 1909.

Application filed November 21, 1908. Serial No. 463,912.

*To all whom it may concern:*

Be it known that I, HUGH P. MAGONE, a citizen of the United States, residing at Race Track, in the county of Powell and State of Montana, have invented certain new and useful Improvements in Hose-Couplers, of which the following is a specification, reference being had to the accompanying drawings.

This invention relates to improvements in hose couplers and more particularly to one by means of which two sections of a hose may be quickly and easily connected together and as readily disconnected.

The object of the invention is to improve and simplify the construction and operation of devices of this character and thereby render the same less expensive and more durable and convenient.

With the above and other objects in view, the invention consists of the novel features of construction and the combination and arrangement of parts hereinafter fully described and claimed, and illustrated in the accompanying drawings, in which—

Figure 1 is a side elevation of the improved hose coupler; Fig. 2 is a top plan view; Fig. 3 is a bottom plan view; Fig. 4 is a longitudinal section on the line 4—4 in Fig. 2; and Fig. 5 is a transverse section on the line 5—5 in Fig. 2.

The improved hose coupler comprises two tubular members 1, 2 each corrugated or otherwise shaped at one end, as shown at 3, to receive a hose section. The member 1 has its outer or free end slightly enlarged and formed with an annular concentric recess 4 which provides a shoulder 5 and a projecting flange 6. The corresponding end of the member 2 is formed upon its outer surface with an annular groove 7 which forms a reduced neck 8 adapted to enter the groove 4 in the member 1 and to engage a gasket or washer 9 arranged upon the shoulder 5 in said groove. At the bottom of the flange 6 is formed a projecting lip or enlargement 10 having a slot or seat 11 to receive a removable retaining lip 12 formed on a curved plate 13 which is secured by screws 14 to the bottom of the member 2. Secured to or formed upon the top of said member 2 or at a point diametrically opposite the plate 13, is a radially projecting keeper lug 14 having a rounded inner end 15 formed with a transverse notch or recess 16. Said lug 14 is adapted to be engaged by a hasp-like fastener 17 which is pivoted to a bearing lug 18 formed upon the top of the member 1 in rear of its enlargement 4. Said fastener 17 has a body preferably formed from a single piece of sheet metal by stamping and bending the same to provide a base portion 20 with a finger piece 21 at one end and two upwardly bent parallel side portions 22 at its other end. These sides 22 are extended beyond the base 20 to provide spaced parallel arms which engage the opposite sides of the lug 18 and are pivoted thereto by a transverse pin 23. Arranged within the body of the fastener 17 is a slide 24 also formed from a single piece of sheet metal to provide a portion which slides upon the part 20 and between the parts 22. Said slide is guided between said parts by forming upon its opposite edges upwardly bent flanges 25 which slide beneath a cross rod 26 arranged in the side plates or arms 22. Said slide 24 is also guided by the engagement of its reduced rear end 27 with a keeper loop 28 upon the top of the handle portion 21 of the fastener. The inner end of the slide is offset and formed with a tongue 29 which serves as a dog to engage the lug 14 and enter its groove 16. Said slide is actuated in an inward direction to project the dog, by a coil spring 30 having one of its ends hooked over the cross rod 26 and its other end engaged with a hook 31 formed on an angular plate 32 which is secured by a rivet 33 to the slide and has an upwardly projecting end forming a finger piece. The spring serves to project the slide inwardly and maintains a shoulder 34 formed upon it by offsetting its inner end or tongue 29, in engagement with a stop 35 formed by bending up the inner end of the base 20. The side plates or arms 22 of the hasp fastener 17 are of such length and so spaced apart that the lug 14 is adapted to enter between them when the handle end 21 of said fastener is swung downwardly upon the top of the member 2, and when said fastener is thus engaged with the lug 14 the dog or sliding tongue 29 is adapted to ride over the curved end of 15 said lug and to finally drop into the recess 16 to lock the fastener upon the keeper lug.

In operation, assuming the parts to be coupled as shown in the drawings, when it is desired to uncouple them, the finger piece formed by the plate 32 is engaged and drawn outwardly against the tension of the coil spring to disengage the dog 29 from the recess or notch 16 in the lug 14, whereupon, the finger piece or handle 21 of the fastener may be engaged and swung upwardly to free the fastener from the lug 14. The two members of the coupling may then be swung away from each other sufficiently to permit the lip 12 to be disengaged from the slot or seat 11, whereupon the members may be entirely disconnected. In coupling the members the above described operation is reversed, as will be readily understood.

Having thus described the invention what is claimed is:

A hose coupler comprising two members, a detachable hinge connection between said members on one side, outwardly projecting lugs upon the opposite sides of said members, the lug on one member having a rounded inner end and seat, a swinging fastener having a channeled body provided with bottom and side flanges, the side flanges being extended beyond one end of the body to provide spaced arms to receive said lugs between them, a transverse pivot uniting the ends of said arms to one of said lugs, a slide arranged in the channeled body of the fastener and adapted to engage the rounded end and seat in the other lug to lock the fastener, a cross rod arranged between the side flanges of the channeled body of the fastener for guiding the inner end of the slide and retaining it in said fastener, a guide upon the outer end of the body of the fastener to receive the outer end of the slide to guide the latter and retain it upon the fastener, a plate secured to the slide and having one end bent up to form a finger piece and its other end bent to form a hook and a coil spring having one end engaged with said hook and its other end engaged with said cross rod, whereby the slide will be projected inwardly.

In testimony whereof I hereunto affix my signature in the presence of two witnesses.

HUGH P. MAGONE.

Witnesses:
   S. E. LARABIE,
   W. W. SMITH.